(12) United States Patent
Alexandrov

(10) Patent No.: US 8,605,968 B2
(45) Date of Patent: Dec. 10, 2013

(54) DETERMINATION OF TISSUE STATES BY IMAGING MASS SPECTROMETRY

(75) Inventor: Fedor Alexandrov, Bremen (DE)

(73) Assignee: Bruker Daltonik GmbH, Bremen (DE)

( * ) Notice: Subject to any disclaimer, the term of this patent is extended or adjusted under 35 U.S.C. 154(b) by 188 days.

(21) Appl. No.: 13/028,676

(22) Filed: Feb. 16, 2011

(65) Prior Publication Data

US 2011/0280455 A1   Nov. 17, 2011

(30) Foreign Application Priority Data

Mar. 2, 2010   (DE) .......................... 10 2010 009 853

(51) Int. Cl.
*G06K 9/00*   (2006.01)

(52) U.S. Cl.
USPC ........................................................ 382/128

(58) Field of Classification Search
USPC ........... 382/128–132; 250/282–288; 435/4–6; 702/19

See application file for complete search history.

(56) References Cited

U.S. PATENT DOCUMENTS

| | | |
|---|---|---|
| 7,873,478 B2 | 1/2011 | Suckau |
| 2006/0063145 A1 | 3/2006 | Suckau et al. |
| 2007/0278400 A1 | 12/2007 | Schurenberg et al. |
| 2008/0142703 A1 | 6/2008 | Schurenberg |
| 2009/0289184 A1 | 11/2009 | Deininger et al. |
| 2011/0092762 A1* | 4/2011 | Wong et al. ..................... 600/34 |

FOREIGN PATENT DOCUMENTS

WO   2010/026225 A1   3/2010

OTHER PUBLICATIONS

Luxembourg, et al., "High-Spatial Resolution Mass Spectrometric Imaging of Peptide and Protein Distributions on a Surface", Anal. Chem. Soc., 2004, pp. 5339-5344, vol. 76, No. 18.

* cited by examiner

*Primary Examiner* — Atiba O Fitzpatrick
(74) *Attorney, Agent, or Firm* — Robic, LLP

(57) ABSTRACT

Spatially resolved tissue states (status image) are determined from spectrally resolved mass spectra of a tissue section by (a) acquiring a plurality of spatially resolved mass spectra of the tissue section, (b) generating at least two mass images from the spatially resolved mass spectra, (c) smoothing the mass images using an edge-preserving smoothing algorithm and (d) calculating a status image from the smoothed mass images by means of a classification algorithm derived from mathematical statistics.

19 Claims, 4 Drawing Sheets

DETERMINATION OF TISSUE STATES BY IMAGING MASS SPECTROMETRY

BACKGROUND

The invention relates to the spatially resolved determination of the nature and state of a tissue from spatially resolved mass spectra of a tissue section. Histology is the science of human, animal and plant tissues, in particular their structure and function. A histological classification of a tissue is equivalent to a determination of the nature and state of the tissue, which can refer to the type and differentiations of the tissue, bacterial and parasitic pathogens in the tissue, the disease status of the tissue or any other change compared to a normal state. In the following, the term "histology" also includes the examination of tissue in order to study manifestations of disease ("histopathology"). The diseases of a tissue relate to inflammatory diseases, metabolic diseases and the detection of tumors, especially the differentiation between benign and malignant forms of tumor.

In a routine histological examination, the nature and state of the tissue are determined via optical images of tissue sections, obtained by microscopes or scanners. Usually, the tissue sections are only a few micrometers thick and are stained in order to increase the contrast in the optical images and emphasize structures in the tissue sections. Histology has so far been mainly a morphologic diagnostic method because the tissue's nature and state are determined according to the appearance and staining properties of the tissue and cell structures. Since normally the method produces an image of a complete tissue section, usually the tissue states at different positions of the tissue section are determined with some spatial resolution.

The nature and state of a tissue can also be indicated at a molecular level as concentration patterns of biological substances such as proteins, nucleic acids, lipids or sugars. A molecular pattern may show that biological substances are underexpressed or overexpressed in certain tissue areas. Proteins, in particular, may also be modified in characteristic ways, e.g. by posttranslational modifications. In recent years, the search for substances which are characteristic of diseases (so-called biomarkers) has developed into a prominent field of clinical research. Usually the biological substances in body fluids (e.g. blood, urine or spinal fluid) or homogenized tissue samples are separated into fractions, typically by solid phase extraction or chromatographic separation methods, followed by mass spectrometric analysis. The measured mass spectra exhibit signal patterns with varying degrees of complexity, which usually originates from peptides, proteins and lipids.

Mass spectra of a tissue sample without prior separation into fractions contain a large amount of molecular information with a multitude of signals. The nature and state of the tissue is generally determined not just by an individual signal, but by a pattern of different signals. There are a multitude of different classification algorithms derived from mathematical statistics which can be used to determine the state of a tissue sample from the high-dimensional signal pattern of its measured mass spectrum, e.g. neuronal networks (Linear Vector Quantization (LVQ), Neural Gas (NG), Self-Organizing Map (SOM)), Support Vector Machines (SVM), genetic algorithms for cluster analysis, Principal Component Analysis (PCA), decision trees or nearest neighbor classification (k-Nearest-Neighbor).

Before the tissue state of a tissue sample can be determined with a classification algorithm, mass spectra of a large number of tissue samples, e.g. of healthy and sick individuals, are first measured and analyzed to ascertain whether the classification algorithm can in fact be used to differentiate between classes, and thus tissue states, using the measured mass spectrometric input data. If there are parameters or parameter intervals for the classification algorithm which allow tissue states to be distinguished in a statistically significant way in the input data, these parameters can be used to assign mass spectra of other tissue samples to one of the classes, and to thus determine the tissue states of these other tissue samples.

Some of the classification algorithms permit automatically determining which signals of the mass spectra are most relevant for a classification, thus reducing the mass spectra to the relevant mass intervals. For example, Principal Component Analysis is used to bring about a reduction of mass intervals to those mass intervals whose signals have the largest influence on the variance of the high-dimensional signal patterns and thus often have the highest information content. In contrast, for "supervised" classification algorithms, such as Support Vector Machines, it is necessary to assign each of the mass spectra used as input data to a class (e.g. diseased or healthy) in the teaching phase, i.e. these "training spectra" carry a label.

In recent years, "imaging mass spectrometry" (IMS) increasingly has been used to analyze histological tissue sections pixel-wise with thousands of spatially resolved mass spectra instead of acquiring spectra of homogenized tissue samples, preferably with MALDI time-of-flight mass spectrometers (MALDI=ionization by matrix assisted laser desorption). Documents U.S. Pat. Nos. 7,667,196 B2 (DE 10 2006 019 530 B4) and 2008/0142703 A1 (DE 10 2006 059 695 B3) (M. Schürenberg et al., 2006) elucidate different methods and devices which can be used to prepare tissue sections on MALDI sample supports. This involves applying a matrix solution in the form of small droplets to a tissue section by vibrational nebulizing, for example, where the solution vaporizes and the matrix substance crystallizes together with the substances extracted from the tissue section.

A raster scan method according to Caprioli (U.S. Pat. No. 5,808,300 A) is usually used to measure, pixel by pixel, spatially resolved MALDI mass spectra. However, partial regions of the tissue section can also be imaged using ion optics (Luxembourg et al., Analytical Chemistry, 76 (18), 2004, 5339-5344: "High-Spatial Resolution Mass Spectrometric Imaging of Peptide and Protein Distributions on a Surface"). In both cases a corresponding mass image of the tissue section results from the signals of each mass interval that is resolved in the mass spectra. The molecular information of the tissue section is present in a spatially resolved form.

According to the document U.S. Pat. No. 7,873,478 B2 (equivalent to GB 2 418 773 B and DE 10 2004 037 512 A1, D. Suckau et al.), mass spectra for a tissue section are measured with spatial resolution, and from each of the spatially resolved mass spectra for each pixel, a tissue state is calculated at the corresponding pixel position of the tissue section. This method is not used to determine a tissue state of a (homogenized) tissue sample, but a status image of the tissue section. The spatially resolved tissue states, as pixels of the status image, are calculated with the above-mentioned classification algorithms derived from mathematical statistics. The information from the large number of measured mass images of the tissue section is summarized in a single status image and is thus presented in a graphic form easily understandable by the user.

The spatially resolved mass spectra of the tissue section under analysis can themselves serve here as input data for the classification algorithm used. This involves selecting spatially resolved mass spectra of a partial region in order to set the parameters of the classification algorithm before the tissue states in other regions are determined. However, the parameters of the classification algorithm can also exist as parameters that have already been evaluated in previous analyses of spatially resolved mass spectra of other tissue sections or of mass spectra from homogenized tissue samples.

In imaging mass spectrometry which uses MALDI ion sources, the spatial resolution (the spatial resolving power) is limited by the application of the matrix layer and its effect on the sample under investigation. In the preparation of tissue sections, the spatial resolution in the mass images is currently between ten and one hundred micrometers. It is therefore not possible to resolve any structures which are smaller than around 5 micrometers in the mass images of tissue sections measured in this way. The spatial resolution is more than an order of magnitude worse than that of the light-optical images of a tissue section. It is no trivial task to apply the matrix layer to the tissue section because (a) a lateral smearing of the biological substances must be avoided, (b) the biological substances must be extracted from the tissue section and incorporated into the crystals of the matrix layer, and (c) a favorable ratio of biologically relevant substances to impurities must be achieved.

The status images of tissue sections calculated according to the prior art have a low signal-to-noise ratio, so structures can often not be discerned sufficiently. Furthermore, the accuracy of classifying tissue states in the status images is lower than with classification from homogenized tissue samples. Different types of classification error occur with every type of classification, including the determination of tissue states. These errors result in statistical parameters which determine the quality of the classification. The parameters include the sensitivity (true positive rate), the specificity (true negative rate), the false positive rate (false alarm) and the false negative rate (undetected case).

SUMMARY

In accordance with the principles of the invention, the quality of spatially resolved tissue states is improved by a method involving the following steps:
(a) acquisition of spatially resolved mass spectra of a tissue section or parts of a tissue section,
(b) generation of at least two mass images from the spatially resolved mass spectra, the mass images comprising the ion current signals of predetermined mass intervals,
(c) smoothing of the mass images using a smoothing algorithm with smoothing parameters, and
(d) calculation of a status image from the smoothed mass images by means of a classification algorithm derived from mathematical statistics.

An edge-preserving smoothing algorithm is preferably used for the smoothing (de-noising) of the mass images; in particular, an edge-preserving smoothing algorithm which has the local variance of the mass images as a local smoothing parameter. It is quite possible here that not only the mass image itself, but also further mass images which belong to other mass intervals are used to smooth a mass image. The number of mass images from which the status image is calculated is preferably between 5 and 100; most preferable is between 10 and 50 and in particular around 15. The signals of the smoothed mass images which are assigned to an individual tissue spot each form a "spatially" smoothed mass spectrum, which is computed with the classification algorithm to give a parameter that is characteristic for the tissue state.

The spatially resolved MALDI mass spectra of a tissue section vary considerably from one tissue spot to the next, one reason being that the matrix layer consists of many small crystals, so the ionization conditions are not homogenous. Another reason is that the signal intensities, and also the presence of signals in MALDI mass spectra, are in principle subject to large fluctuations as a result of the complex ionization process, and these fluctuations can be only compensated for to a limited extent by summing a large number of individual spectra. With spatially resolved mass spectra in particular, however, the summation of individual spectra is limited by the fact that each individual spectrum is acquired at only one individual tissue spot in order to achieve the best possible spatial resolution. A spatial averaging of individual spectra on the sample is impossible here. Furthermore, it must be noted that a tissue section as a sample is not purified and therefore a large number of substances and impurities, e.g. salts, are present which lead to increased chemical noise in the mass images. The fundamental idea of the present invention consists in first subjecting the mass images to a smoothing process before they are computed to give a status image. Smoothing a status image calculated from mass images that have not been de-noised requires significantly less computational effort due to the smaller number of images to be processed, but does not sufficiently solve the objective on which the invention is based.

In the method elucidated in the document U.S. Pat. No. 7,873,478 B2, only the mass spectrum which was measured at a single tissue spot, or parts thereof, is used to determine the tissue state of this spot. In the method according to the invention, however, mass spectrometric information from the environment of the tissue spot is also taken into account when determining its state. This is achieved by smoothing the mass images before the status image is calculated, thus changing the mass images locally depending on their environment. As described above, it is also possible to include not only the environments within the mass image itself, but also the relevant environments in the other mass images, in the smoothing of a mass image. The inclusion of mass spectrometric information from the environment or the environments leads to a suppression of noise signals and an enhancement of the information-carrying signals in the smoothed mass images, which significantly improves the quality of the classification and in particular the ability to discern regional boundaries with different tissue states. The histologically relevant structures of tissue sections are often only a few micrometers in size and could only just be resolved by the imaging mass spectrometry currently available with a spatial resolution of around 5 micrometers. The poor quality of the status images calculated according to the prior art means that, currently, even structures above the spatial resolution can often no longer be discerned. By using the method according to the invention, in particular by using edge-preserving smoothing algorithms, it is possible to discern structures which consist of lines of individual pixels in the status images despite the poor quality of the mass images.

In routine histological examination, the mass intervals and parameters or parameter intervals used are usually specified in order to select at least two mass images from the spatially resolved mass spectra, to smooth the mass images and to calculate a status image from this. The mass intervals and parameters are laid down in an evaluation which takes place before the routine examination, whereby the mass intervals and parameters are optimized in a usually iterative process. If the classification of tissue states has already been established from relevant mass intervals, the evaluation can encompass only the optimization of the smoothing parameters.

For an evaluation, several of the spatially resolved mass spectra of a tissue section can be used as input data; mass spectra of partial regions may be selected on account of additionally available information, e.g. from light-optical images of the tissue section, and thus different types of tissue or regions of diseased and healthy tissue may be taken into account. The selection of mass intervals in the spatially resolved mass spectra, with which an iterative optimization process is started, can be done in different ways. On the one hand, those mass intervals can be selected which, in the sum spectrum from all mass spectra, contain signals that are larger than a threshold value or belong to the largest signals. On the other hand, those mass intervals can be selected which, in a relative or absolute minimum number of the mass spectra, contain signals that are larger than a threshold value or belong to the largest signals. Likewise, a list of mass intervals can be used initially whose signals have proven to be relevant in similar evaluations.

Starting from the selected mass intervals, mass images are generated which, according to the invention, are de-noised with a smoothing algorithm before being computed with a classification algorithm to give a status image. These steps are repeated again and again with changed mass intervals and parameters of the smoothing and classification algorithm until an optimum status image of the tissue section is achieved. The quality of the calculated status image can, for example, be defined by the contrast and the ability to discern structures in the status image and/or by the degree of conformity with structures in another image, e.g. in a light-optical image of the tissue section. For an evaluation, it is preferable to not only use the spatially resolved mass spectra of one tissue section, but those of several tissue sections of the same type.

DETAILED DESCRIPTION

FIGS. 1A-1D depict an example of a preferred embodiment of the method according to the invention with the steps A to D, wherein a status image (50) is calculated from spatially resolved mass spectra (20) of a tissue section (1).

Figure 1A:
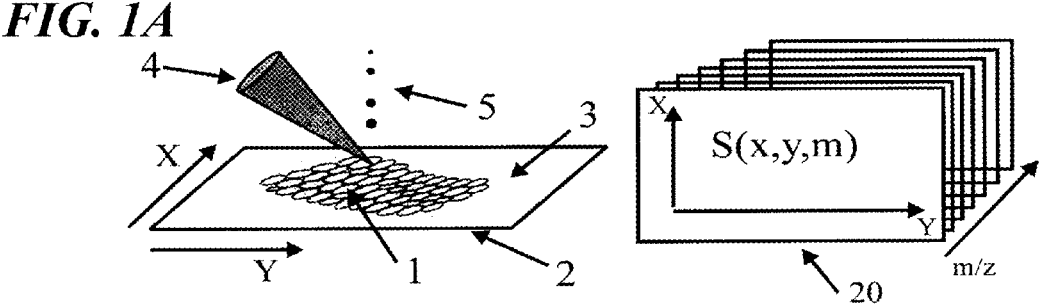
FIGS. 1A-1D are a schematic representation of a preferred procedure for determining spatially resolved tissue states of a tissue section (1) from spatially resolved mass spectra (20).

In step A shown in FIG. 1A, the tissue section (1) is prepared on a sample support (2), and spatially resolved mass spectra $S(x,y,m)$ (20) of the tissue section (1) are acquired. The preparation involves initially stabilizing a tissue sample by freezing and cutting it with a microtome into several tissue sections around ten micrometers thick (not shown). The tissue section (1) is applied to the sample support (2), which has an electrically conductive surface. A matrix layer (3) is prepared on the tissue section (1). The devices and methods which are to be preferably used for this are described in detail in the documents U.S. Pat. No. 7,667,196 B2 and US 2008/0142703 A1 cited above.

The tissue section (1) prepared with the matrix layer (3) is then scanned with laser pulses of a focused laser beam (4) in the x and y directions; there are several hundred pixels in both directions. In order to go from one pixel to the next, the sample support (2) is moved along the x and y axes by a movement device (not shown). Every pixel $(x_i,y_k)$ is irradiated at least once in this process, and usually ten to a hundred times. The ions (5) generated by the individual MALDI processes are analyzed in a time-of-flight mass spectrometer (not shown) with axial ion injection so that a spatially resolved mass spectrum $S(x_i,y_k,m)$ from summed individual spectra is assigned to every pixel $(x_i,y_k)$. Another way of viewing all the spatially resolved mass spectra $S(x,y,m)$ (20) consists in dividing the mass spectra into mass intervals so that the signals in one mass interval m, produce a two-dimensional mass image $S(x,y,m_i)$, and the spatially resolved mass spectra $S(x,y,m)$ (20) are composed of a large number of mass images.

A mass spectrometer fundamentally separates the ions according to the ratio of their mass m to the number z of their unbalanced elementary charges (m/z, also termed the "charge-related mass"). A measured mass spectrum can be used to derive the charge-related mass m/z and hence the physical mass m. Since ionization by matrix-assisted laser desorption essentially provides only singly charged ions, the term "mass" rather than "charge-related mass" will be used below for the sake of simplification. In principle, mass spectrometric analysis can be conducted with a wide variety of mass spectrometers. For imaging mass spectrometry (IMS), time-of-flight mass spectrometers (TOF-MS) with axial ion injection are currently mainly used, but time-of-flight mass spectrometers with orthogonal ion injection, ion traps or ion cyclotron resonance mass spectrometers, for example, can also be used.

Figure 1B:
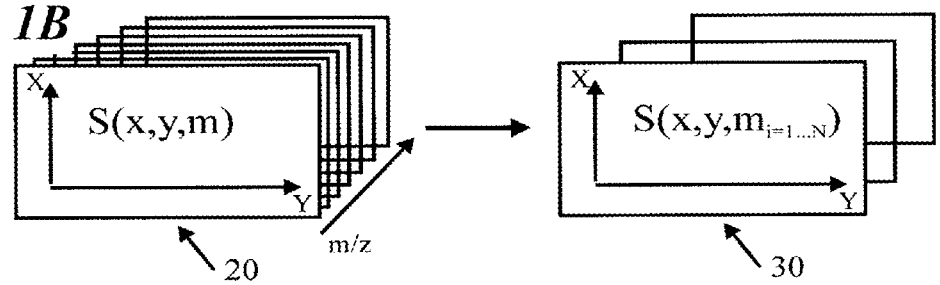

In Step B shown in FIG. 1B, mass images are selected from the spatially resolved mass spectra $S(x,y,m)$ (20), i.e. at least two mass images $S(x,y,m_{i=1...N})$ (30) (N≥2) are selected from all the mass images $S(x,y,m)$ (20). In routine histological examination, the selection of the mass images $S(x,y,m_{i=1...N})$ (30) is usually carried out using a previously evaluated list of mass intervals which are adapted to the histological problem, so that they are ideal for discriminating between healthy and cancerous tissue regions in a certain organ, for example.

Figure 1C:
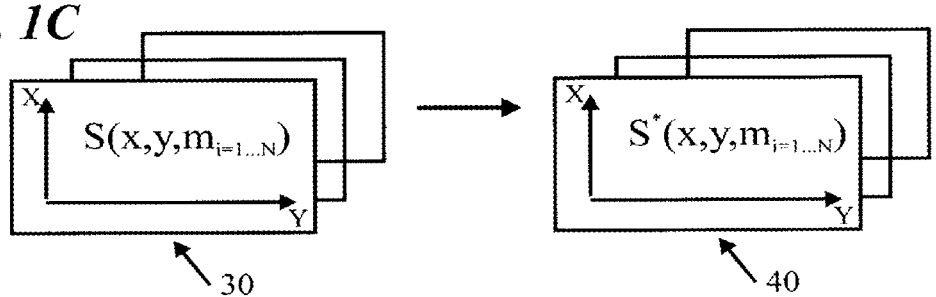

In Step C shown in FIG. 1C, each of the selected mass images $S(x,y,m_{i=1...N})$ (30) generated in Step B is de-noised with an edge-preserving smoothing algorithm so that N smoothed mass images $S^*(x,y,m_{i=1...N})$ (40) result from the N mass images $S(x,y,m_{i=1...N})$ (30). In accordance with Equation 1, the edge-preserving smoothing algorithm used here is defined by the fact that a smoothed mass image $S^*$ assumes a minimum for the optimization functional O:

$$O[S^*]=\int|\nabla S^*|dxdy+\lambda\cdot\int(S^*-S)^2 dxdy, \qquad (1)$$

where S is one of the mass images $S(x,y,m_{i=1...N})$ (30), $S^*$ is the smoothed mass image calculated from it, and $\lambda$ is a control parameter.

The integrals in Equation 1 are to be understood as the summation over the pixels of the mass images. The first term of the optimization functional O minimizes the so-called total variance $\int|\nabla S^*|dxdy$, i.e. the integrated value of the image gradient of the smoothed mass image $S^*$, and thus the noise in the smoothed mass image $S^*$. The second term of the optimization functional O is a correction term and contains the boundary condition that the smoothed mass image S* is close to the original mass image S as specified by the applied Euclidean norm. The addition of both terms ensures that the smoothed mass image S* deviates little from the original mass image S, but at the same time has the smallest possible total variance and thus as little noise as possible. It is important here that the preferred smoothing algorithm reconstructs noisy image regions with constant signals but without smearing the edges in the process, as is the case for other, less favorable smoothing algorithms, which, for example, are based on a convolution with a smoothing function (convolution smoothing). The control parameter λ determines the degree of smoothing: the smoothing of the mass image S* is greater, the smaller the control parameter.

In a most preferable edge-preserving smoothing algorithm, the control parameter λ is not constant, but a locally variable parameter λ(x,y), which takes the local variance of the original mass image into account in the smoothing. The optimization functional O of the above-mentioned smoothing algorithm can be modified as follows in this case:

$$O[S^*]=\int|\nabla S^*|dxdy+\int\lambda(x,y)\cdot(S^*-S)^2 dxdy$$

Figure 1D:
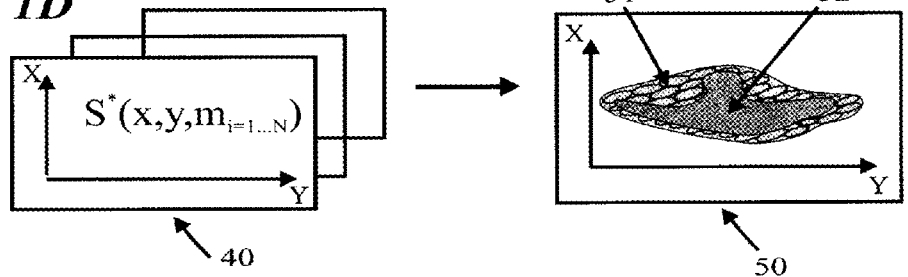

In Step D shown in FIG. 1D, a status image (50) is calculated from the smoothed mass images $S^*(x,y,m_{i=1\ldots N})$ (40) and displayed graphically. The calculation of the status image (50) is performed with a classification algorithm known from the prior art. In status image (50) two differently classified tissue regions with healthy tissue (51) and cancerous tissue (52) can be discerned. Such a status image (50) can, for example, be used to classify the tissue specimen of a biopsy or to assess, either during or after a surgical intervention, whether sufficient cancerous tissue has been removed.

There is also the option of removing the matrix layer (3) from the tissue section (1) after the spatially resolved mass spectra (20) have been acquired, and staining the exposed tissue section (1) with hematoxylin eosin according to a standard histological protocol. It is very surprising that a light-optical image thus obtained has the same, or almost the same, information content as that of a tissue section to which no matrix layer was applied. Since the status image (50) and the light-optical image originate from the same tissue section (1), there are no problems in superimposing the two pictures and comparing them.

Figure 2A:
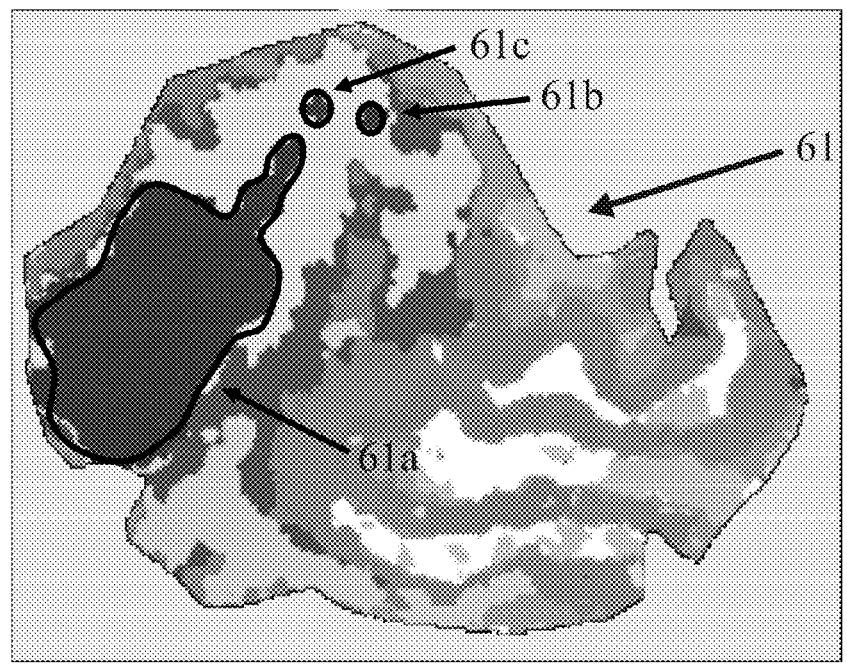
FIG. 2A shows a status image (61) of the tissue section of a human neuroendocrine tumor calculated with a method according to the invention.
Figure 2B:
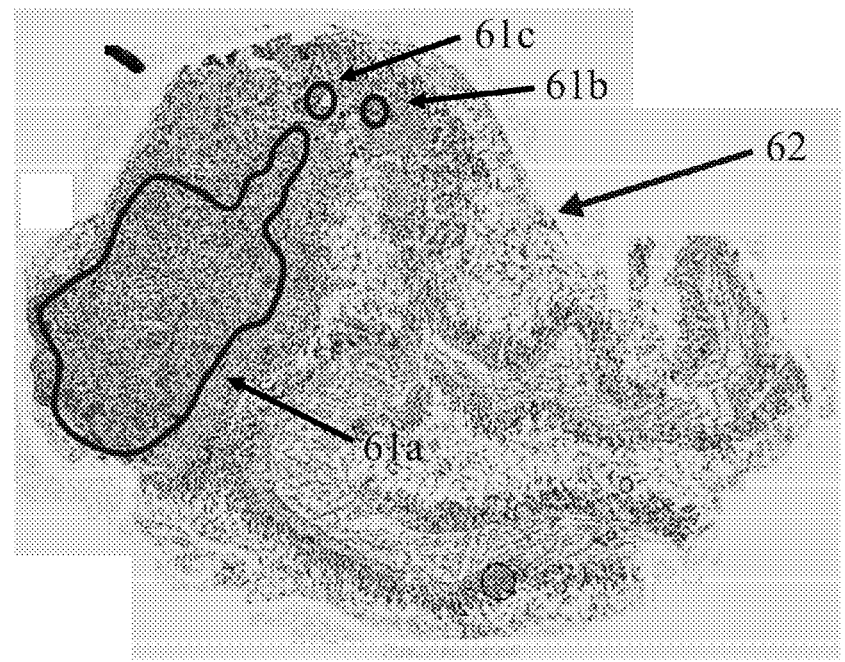
FIG. 2B shows a light-optical image (62) taken from the same tissue sample used to generate the status image shown in FIG. 2A.

FIG. 2A depicts a status image (61) and FIG. 2B depicts a light-optical image (62) of the tissue section of a human neuroendocrine tumor. The status image (61) was calculated with the method shown in FIG. 1 from 500×350 measured mass spectra. The matrix layer was removed from the tissue section of the tumor after the spatially resolved mass spectra have been acquired, and the tissue section was stained with hematoxylin eosin before the light-optical image (62) was taken.

In accordance with Step B from FIG. 1B, fifteen evaluated mass intervals are used to generate fifteen mass images from the spatially resolved mass spectra of the tissue section. The mass images are each de-noised with an edge-preserving smoothing algorithm in accordance with Equation 1. The de-noised mass images are computed with the HDDC method (High Dimensional Discriminant Clustering) known from the prior art to generate the status image (61), which depicts ten classes coded into shades of gray.

The tissue regions (61a) to (61c) marked in the status image (61) and also in the light-optical image (62) are assigned to one of the ten classes of the status image (61). The tissue state in the tissue regions (61a) to (61c) correlates with morphologic characteristics of cells and intracellular components in the light-optical image (62) which occur with a cancerous change of the tissue.

Figure 2C:
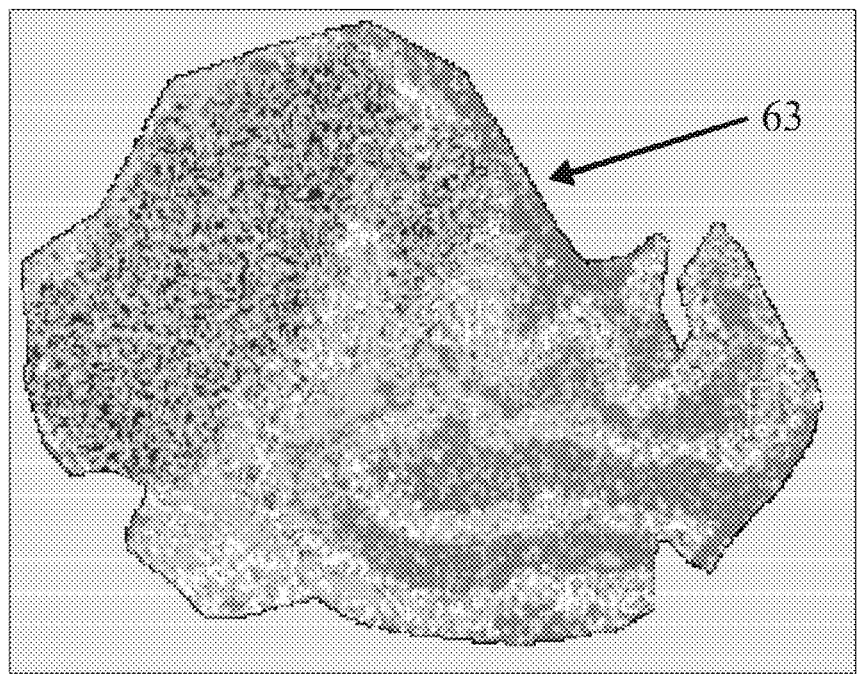
FIG. 2C shows a second status image (63) calculated from the same tissue sample that was used to calculate the status image shown in FIG. 2A, but without smoothing of the mass images.

FIG. 2C illustrates a status image (63) which has been calculated in the same way as the status image (61) except for the de-noising of the mass images, i.e. from the same spatially resolved mass spectra and mass intervals and with the same classification algorithm. A comparison of the two status images (61) and (63) shows that in the status image (63) the regions of cancerous tissue (61a) to (61c) are not distinguished from regions of healthy tissue. In the tissue regions (61a) to (61c) and extending past their boundaries, the status image (63) contains different classes which form a fine-grained pattern of spots. A histological classification is greatly limited or almost impossible in the status image (63) due to the fine grain of the pattern of spots. The method according to the invention, on the other hand, makes it possible to localize cancerous tissue regions with a high classification quality.

Figure 3A:
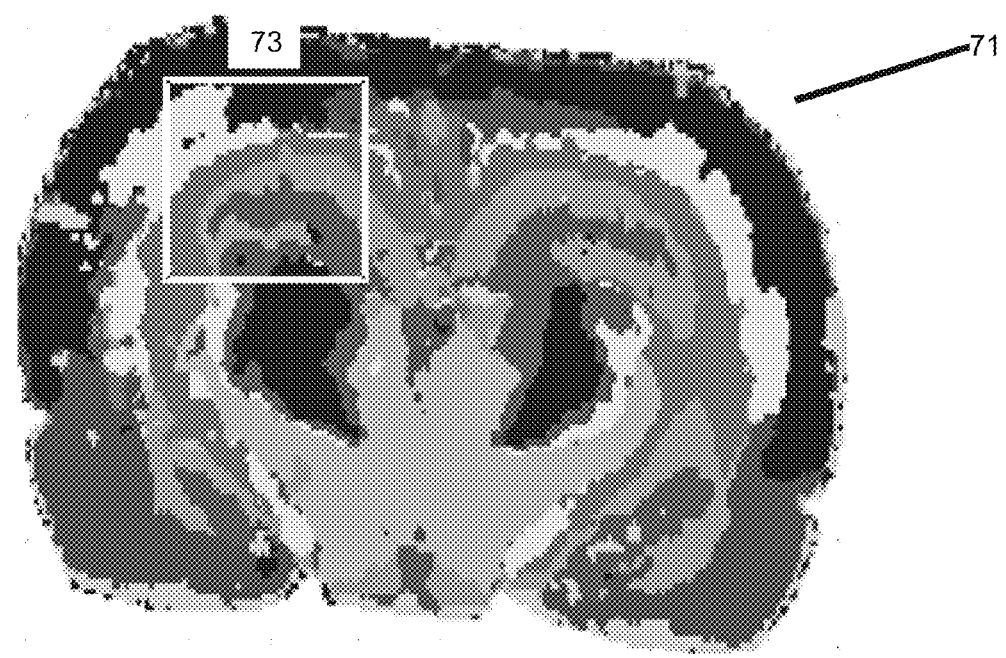
FIG. 3A shows a status image (71) of the tissue section of a rat brain calculated with a method according to the invention
Figure 3B:
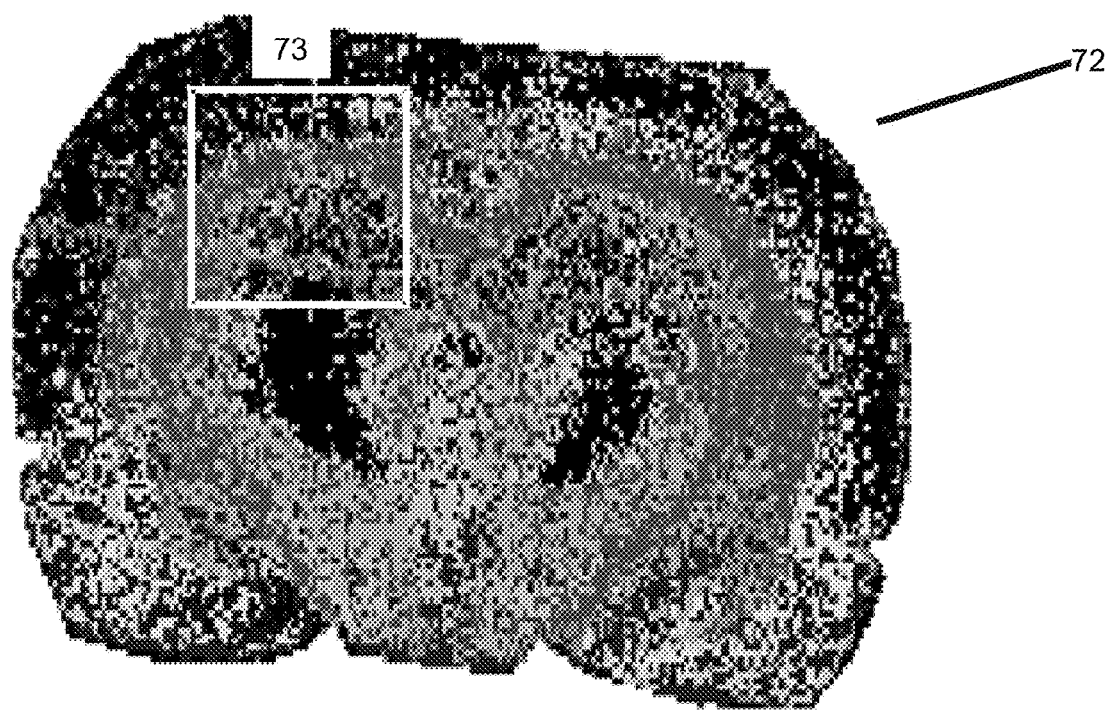
FIG. 3B shows a second status image (72) obtained without smoothing of the mass images.

FIGS. 3A and 3B depict two status images (71) and (72) of the tissue section of a rat's brain. The status image (71) is calculated with the method according to the invention shown in FIGS. 1A-1D from spatially resolved mass spectra. In contrast, the status image (72) has been calculated from the same signals of the spatially resolved mass spectra, but without the corresponding mass images being de-noised.

Those mass intervals which have signals in at least five percent of all 200×120 spatially resolved mass spectra are selected to generate the mass images here. This selection criterion results in a total of 25 mass intervals. The 25 corresponding mass images are de-noised with an edge-preserving smoothing algorithm in accordance with Equation 1 in order to calculate the status image (71). As in the previous example embodiment, the de-noised mass images and the non-de-noised mass images are computed with the HDDC method (High Dimensional Discriminant Clustering) to give the status images (71) and (72) respectively. The quality of the status image (71) is optimized via the control parameter λ in Equation 1 in several iterations.

As can be seen clearly in status image (71), the spatially resolved mass spectra are classified with the method according to the invention into anatomically relevant tissue states. The status image (71) correlates outstandingly well with light-optical images of rats' brains. Compared with the status image (72), even structures at the limit of the spatial resolution provided by the MALDI process are still discernable to some extent. A comparison of the two status images (71) and (72) in the region of the tissue marked (73), in particular, shows the great difference in quality between them. Even a subsequent and less complex smoothing of the status image (72) does not achieve the quality of the status image (71). In addition to the better ability to discern structures, status image (71) exhibits a significantly higher classification quality than status image (72) because the large spatial fluctuation of the calculated tissue states in the status image (72) does not permit a reliable classification, at least not in partial regions.

While the invention has been shown and described with reference to a number of embodiments thereof, it will be recognized by those skilled in the art that various changes in form and detail may be made herein without departing from the spirit and scope of the invention as defined by the appended claims.

What is claimed is:

1. A method for the spatially resolved determination of tissues states of a tissue section, comprising:
   (a) acquiring a plurality of spatially resolved mass spectra of the tissue section or parts of the tissue section, the spatially resolved mass spectra comprising the mass spectra at each of a plurality of pixels across a two-dimensional area of the tissue section;

(b) selecting at least two mass images from the plurality of spatially resolved mass spectra, each of the selected mass images comprising the mass signals for said plurality of pixels at a different one of a plurality of predetermined mass intervals into which the spatially resolved mass spectra are divided;

(c) smoothing the selected mass images using a smoothing algorithm with smoothing parameters; and (d) calculating a status image from the smoothed mass images using a classification algorithm derived from mathematical statistics.

2. The method of claim 1, wherein step (c) comprises smoothing the selected mass images in a partial region of the tissue section and step (d) comprises calculating the status image for the partial region.

3. The method of claim 1, further comprising graphically presenting the status image.

4. The method of claim 1, further comprising acquiring a light-optical image of the tissue section after step (a).

5. The method of claim 4, further comprising simultaneously graphically presenting both the light-optical image and the status image of the tissue section.

6. The method of claim 1, wherein step (a) comprises acquiring the plurality of spatially resolved mass spectra with a MALDI time-of-flight mass spectrometer.

7. The method of claim 1, wherein step (b) comprises selecting more than tem mass images.

8. The method of claim 1, wherein step (c) comprises smoothing the mass images using an edge-preserving smoothing algorithm.

9. The method of claim 8, wherein the edge-preserving smoothing algorithm uses an optimization function O that assumes a minimum for a smoothed mass image S*, the function O given by:

$$O[S^*]=\int|\nabla S^*|dxdy+\lambda \cdot \int (S^*-S)^2 dxdy,$$

where S is a mass image, S* is the smoothed mass image and $\lambda$ is a control parameter.

10. The method of claim 8, wherein the edge-preserving smoothing algorithm has a local variance in a mass image to be smoothed as a local parameter.

11. The method of claim 10, wherein the edge-preserving smoothing algorithm uses an optimization function O that assumes a minimum for a smoothed mass image S*, the function O given by:

$$O[S^*]=\int|\nabla S^*|dxdy+\int \lambda(x,y) \cdot (S^*-S)^2 dxdy,$$

where S is a mass image, S* is the smoothed mass image, and $\lambda(x,y)$ is the local parameter.

12. The method of claim 9, wherein step (b) comprises selecting mass images from the plurality of spatially resolved mass spectra based on a list of specified mass intervals.

13. A method for the spatially resolved determination of tissues states of a tissue section, comprising:

(a) acquiring a plurality of spatially resolved mass spectra of the tissue section;

(b) selecting a plurality of mass intervals in the spatially resolved mass spectra;

(c) generating mass images of the tissue section, where each mass image consists of the mass signals of the spatially resolved mass spectra of a mass interval;

(d) smoothing the mass images by a smoothing algorithm with smoothing parameters;

(e) calculating a status image from the smoothed mass images using a classification algorithm derived from mathematical statistics; and (f) repeating steps (c) to (e) varying the mass intervals and smoothing parameters until the quality of the status image assumes an optimum.

14. The method of claim 13, wherein the quality of the status image is defined by the contrast and the ability to discern structures in the status image.

15. The method of claim 13, wherein the quality of the status image is defined by the contrast and by the degree of conformity with structures in another image.

16. The method of claim 14, wherein the other image is a light-optical image of the tissue section.

17. The method of claim 13, wherein step (b) comprises adding together the plurality of spatially resolved mass spectra to form a sum spectrum, and selecting those mass intervals which, in the sum spectrum, contain signals that are larger than a predetermined threshold value or belong to the largest signals.

18. The method of claim 13, wherein step (b) comprises selecting those mass intervals which, in at least one of the plurality of spatially resolved mass spectra, contain signals that are larger than a predetermined threshold value or belong to the largest signals.

19. The method of claim 13, wherein step (b) comprises selecting those mass intervals which, in a relative or absolute number of the plurality of spatially resolved mass spectra, contain signals that are larger than a predetermined threshold value or belong to the largest signals.

* * * * *